March 11, 1924.

D. H. COX

TIRE GAUGE HOLDER

Filed March 15, 1923

1,486,230

Inventor
David H. Cox
By Church & Church
his Attorneys

Patented Mar. 11, 1924.

1,486,230

UNITED STATES PATENT OFFICE.

DAVID H. COX, OF ROSELLE, NEW JERSEY.

TIRE-GAUGE HOLDER.

Application filed March 15, 1923. Serial No. 625,335.

*To all whom it may concern:*

Be it known that I, DAVID H. COX, a citizen of the United States, residing at Roselle, in the county of Union and State of New Jersey, have invented certain new and useful Improvements in Tire-Gauge Holders; and I do hereby declare the following to be a full, clear, and exact description of the same, reference being had to the accompanying drawings, forming a part of this specification.

This invention relates to a tool especially adapted for carrying a tire gauge and for holding said gauge when the latter is used.

As the tire gauges now in common use are comparatively small and have rather highly finished surfaces that cannot be too firmly grasped in one's fingers, especially in cold weather, an object of the present invention is to provide a tool that will render quite easy and convenient the application of such a gauge to the valve stem of a pneumatic tire when it is desired to ascertain the amount of air within the tire.

A further object of the invention is to provide a tool that will accommodate the gauge when the latter is not in use, thus reducing the liability of loss of the gauge.

With these and other objects in view, the invention consists in the details of construction to be hereinafter more fully described and claimed and illustrated in the accompanying drawings.

In said drawings—

In its preferred form the present invention contemplates a tool having a handle 10 bored at one end to form a cavity 11 in which the tire gauge may conveniently be carried when not in use, said gauge being retained in the cavity by a cap 12 removably secured to that end of the handle.

Figure 1:
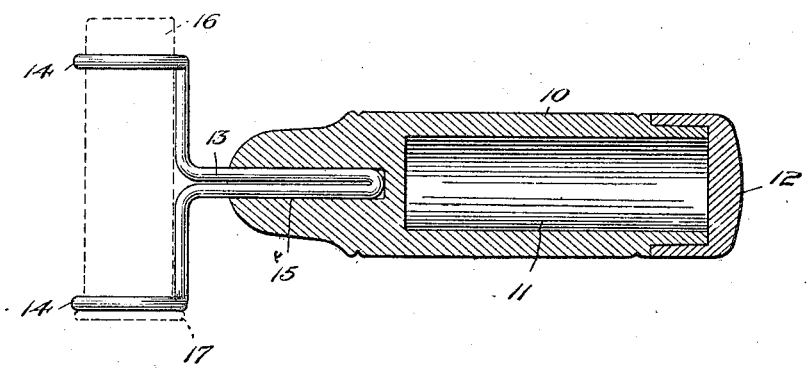
Figure 1 is a plan view of a tool illustrating the preferred embodiment of the present invention.
Figure 2:
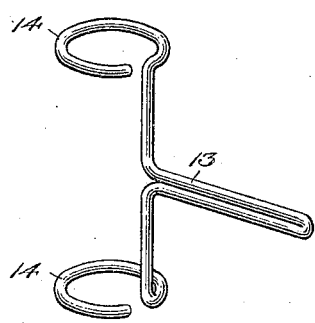
Fig. 2 is a detail view of the gauge holding members.

At its opposite end the tool handle is provided with means for holding the tire gauge when the latter is to be placed against the valve end of the valve stem of a tire. These gauge holding means may take any one of several forms but as shown in Figs. 1 and 2 said holding means consists of a length of relatively heavy wire bent upon itself at the middle to form a stem 13 and having its ends bent in opposite directions and curved to form two substantially circular eyes 14. The eyes 14, which are of a proper diameter to accommodate the tire gauge, are spaced apart transversely of the handle 10 and are in registry with each other. The stem 13 of the holder is secured in an axially extending recess 15 in handle 10.

When it is desired to apply or place the gauge to the valve stem, the gauge is removed from the cavity 11 and slipped into the eyes 14 where it will be frictionally held by the eyes due to the resiliency of the latter. The gauge 16 (shown in dotted lines) has a major and a minor diameter and its major diameter is greater than the diameter of eyes 14. That is, the gauge has a bead 17 at the end which is placed against the tire valve stem and this bead engages one of the eyes 14 and prevents the gauge being pushed out of the holding eyes when it is pressed against the valve stem.

With a tool such as described, the application of the gauge to the valve stem is greatly facilitated and the tool will be found very convenient to the operators of machines, especially in severe weather when, due to low temperatures, their hands and fingers are not quite so nimble as usual.

Figure 3:
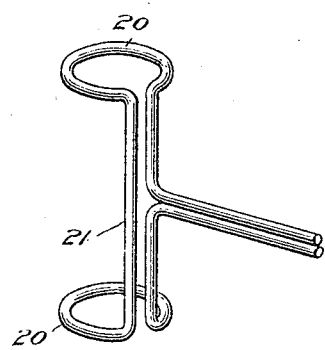
Fig. 3 is a modified form of tool embodying the present invention.

In the modified form of tool disclosed in Fig. 3, the eyes 20 are formed a little differently. In this form the middle portion of the wire extends at right angles to the handle and at each end of said middle portion the wire is bent to form the eyes. The wire is then bent parallel to the middle portion and then bent at right angles thereto to form a shank which is embedded in the handle. As is apparent, however, the means for holding the gauge when it is placed against the valve stem may assume either of the above described forms or may be formed in or on the handle 10 in other various ways and the present invention is, therefore, not to be restricted to the particular form of eyes except where so limited in the appended claims.

Furthermore, while the tool has been described as being especially designed for the keeping and using of a tire gauge, it will be understood that it is not necessarily limited to such usage only as the two spaced metallic eyes render it adaptable for use in testing the spark plugs of one's engine.

What is claimed is:

1. In a tire gauge holder, a handle having means fixedly secured therein for holding the gauge when applied to a valve stem, longitudinal movement of the gauge in one direction in the holding means being limited by said holding means, whereby the gauge may be forced in the opposite direction against a valve stem.

2. In a tire gauge holder, the combination of a handle and resilient gripping members fixedly secured in the handle for holding the gauge when applied to a valve stem, longitudinal movement of said gauge in one direction in the gripping members being limited by said members, whereby the gauge may be forced in the opposite direction against the valve stem.

3. In a tire gauge holder, the combination of a handle and means secured to the handle for holding said gauge when applied to a valve stem, said holding means comprising spaced yielding ring-like members in registry with each other and adapted to substantially encircle the gauge but of a diameter less than the greatest cross sectional dimension of the gauge.

4. In a tire gauge holder, the combination of a handle, and a holder secured therein, said holder being formed with a plurality of eyes in registry with each other and adapted to encircle the gauge, one of said eyes being of a diameter less than the greatest cross sectional dimension of said gauge whereby the gauge may be pressed against the valve.

5. In a tire gauge holder, the combination of a handle having a recess therein, and gauge holding means formed of a single length of relatively heavy wire having its middle portion bent upon itself forming a stem adapted to be secured in said recess in the handle and having its end portions bent in opposite directions and formed into eyes spaced transversely of the handle and positioned in registry with each other for receiving the gauge, said eyes being of a diameter less than the greatest cross sectional dimension of said gauge.

DAVID H. COX.